United States Patent [19]

Horn et al.

[11] Patent Number: 4,684,309
[45] Date of Patent: Aug. 4, 1987

[54] SYSTEM AND APPARATUS FOR USE IN FABRICATING SMALL TUBULAR ARTICLES

[75] Inventors: Charles Horn; Rickey L. Kelly; Thomas E. Orendorf; Terry L. Kiger, all of Dayton, Ohio

[73] Assignee: Vulcan Tool Company, Dayton, Ohio

[21] Appl. No.: 527,038

[22] Filed: Aug. 29, 1983

[51] Int. Cl.⁴ .......................................... B65H 29/00
[52] U.S. Cl. .................................. 414/224; 193/2 C; 193/25 C; 193/38; 198/346.2; 198/468.6; 198/468.2; 198/803.9; 221/242; 294/116; 414/225
[58] Field of Search .............. 414/222, 224, 225, 226, 414/900, 131, 46, 50; 221/242, 274; 294/116; 193/2 C, 25 C, 38, 41; 198/489, 346.2, 468.6, 468.2, 803.9

[56] References Cited

U.S. PATENT DOCUMENTS

| | | | |
|---|---|---|---|
| 2,906,424 | 9/1959 | Bellandi | 198/489 X |
| 3,008,589 | 11/1961 | Caldwell | 414/225 |
| 3,019,943 | 2/1962 | Curry | 221/274 X |
| 3,361,506 | 1/1968 | Newberry | 221/242 X |
| 3,954,164 | 5/1976 | Bottomkey | 198/346.2 |
| 3,981,673 | 9/1976 | Sokolow | 294/116 X |
| 4,182,591 | 1/1980 | Stawelle | 193/25 C X |

FOREIGN PATENT DOCUMENTS

1477602  3/1967  France ................. 414/745

Primary Examiner—Robert J. Spar
Assistant Examiner—Donald W. Underwood
Attorney, Agent, or Firm—Jerome P. Bloom

[57] ABSTRACT

A system, apparatus and procedure for processing tubular or cylindrical stock, particularly short lengths thereof, into precision formed end products includes a chute, preferably formed of a pair of parallel wall surfaces mounting opposed guide plates at least a portion of which are adjustable. The orientation of the chute and its cross section are made such that in the delivery thereof the longitudinal axis of the stock is maintained substantially parallel to the position in which such axis must be set for the working thereof. A transfer device cycled to and from the delivery end of the chute successively receives elements of the stock discharged therefrom and carries them to a work station without change of their orientation. Upon reaching said working station, said transfer device first holds the stock loosely against a complementary abutment surface, essentially in the attitude required for the working thereof. As it moves said stock into said working station, said transfer device triggers the operation of mechanical fingers which then function to precisely set the stock, whereupon the transfer device is pressured to clamp the stock in a fixed relation to said abutment surface and the fingers are displaced to enable the working of the stock by applied tooling. When the work is complete, the transfer device recycles to the chute, in the process of which the stock is induced to move to its next station.

17 Claims, 8 Drawing Figures

SYSTEM AND APPARATUS FOR USE IN FABRICATING SMALL TUBULAR ARTICLES

BACKGROUND OF THE INVENTION

This invention relates to systems, apparatus, and procedures facilitating a high speed movement of tubular or cylindrical articles, elements and parts to a working station, the precise positioning and working thereof within said station and their subsequent discharge from said station in the course of their manufacture.

Apparatus embodiments feature new and improve channeling and transfer devices as well as gripping and positioning devices which are simple and economical to manufacture, most efficient and satisfactory in use, highly versatile as to their application and unlikely to malfunction. A composite of illustrative embodiments of such devices will be particularly described with reference to their application in producing a new and improved system for and method of executing particular steps in the fabrication of a small tubular element the finished product of which must be relatively precise as to its form and dimension. It must be understood, however, that this is only for purpose of demonstration and not by way of limitation, either as to the form or nature of their embodiment or the scope of their application.

The problem underlying the invention was an obvious and recognized need for a simpler, more economical, precision oriented means and method for the high speed conversion of basic tubular stock into quality end products.

The present inventors are not aware of any prior art which renders obvious or is specifically pertinent to what they consider to be the points of novelty of their invention.

SUMMARY OF THE INVENTION

One embodiment of the invention, applied, by way of example, to tubular stock, includes a number of uniquely constructed components which simply and effectively interact, product a delivery of the stock, in short lengths thereof, to a working station, position and accurately set the stock to insure a precision working thereof in said station and thereafter induce its discharge.

The principal of these components are series related. A first thereof comprises a channeling device which in its preferred embodiment defines a chute formed by two wall structures providing relatively spaced parallel wall surfaces mounting opposed relatively movable guide plates, the respective positions of which may be variously set to determine the cross section and length of the delivery passage of the chute. The stock discharges from the chute to a transfer device which cycles between the chute and working station and provides a second of said principal components. A preferred embodiment of this transfer device is a pivotally mounted arm including a head having a pocket which in the course of its cyclic movement receives and nests therein the short length of the tubular stock which is lowermost in the chute, carries the stock to the tool or tooling provided in said working station, assists in the precise setting and holding of the stock for the working thereof and then induces its discharge to its next station in a reverse movement thereof, in the course of which to position its pocket to receive and nest therein a following length of tubular stock. Means are provided to prevent stock from discharging from the chute until such time as the pocket in the head of the arm aligns with its exit opening. A third of said principal components comprises structure located in an adjacent spaced relation to said working station and rendered operative by said transfer device in the course of its delivery of stock to said station, to provide that the stock is at that time set in that position which insures a precision working thereof by applied tooling. A preferred embodiment of this component includes mechanical fingers which are normally biased to assume a spread configuration disposed outwardly of and then applied to close in on opposite, remote surface portions of the stock on its delivery to the working station to contribute to a precise positioning and orientation thereof, following which the stock is then fixed with reference to the tooling by which it must be worked.

As it is brought into the working station, the tubular stock is brought into contact with a limiting abutment surface the shape of which is complementary to that of the surface portion of the head of the transfer arm which carries the stock. The stock is then loosely held, substantially in alignment with the tooling to be applied to its respective ends pending the application of the aforementioned mechanical fingers which in the embodiment illustrated are triggered to respectively dispose outward of the respective ends of the stock, equidistant from that position required of the center of the axial length of the stock for its precision working by the applied tooling. As the fingers are induced to close, the tips thereof move uniformly inward towards this center, at the same rate, and in the process thereof (if the axial position of the stock is not that required) they move the stock axially and clamp to the ends of the stock to precisely set it in that position required to insure a precision working of its ends. At such time the transfer arm is subjected to increased pressure, causing it to firmly clamp the stock against said limiting abutment surface. The fingers are then displaced to permit the working of the stock. When the working is completed, the transfer arm is induced to pivot reversely, away from the working station, in the direction of the chute, whereupon, due to the form of the head of the arm and the pocket in which the stock is carried, the stock is induced, inherently, to roll off the head, by reason of inertia, and drop into a slide or chute device for its discharge to a bin or another station. As the pocket in the head of the transfer arm aligns once more with the discharge end of the chute, such end is cleared sufficiently to permit the length of stock then lowermost in its delivery passage to drop into said pocket, whereupon the cycle of the arm as above described is then repeated.

A primary object of the invention is to provide apparatus particularly applicable to the processing of tubular or cylindrical stock and converting it into precision formed products in a fabricating procedure which is economical, most efficient and satisfactory in use, most effective in its application and free of malfunction.

Another object is to provide a new and improved means and procedure for working tubular stock into precision formed end products.

A further object is to provide new and improved means for delivering tubular stock to a working station, accurately setting the position required thereof with reference to applied tools and simply inducing its discharge from said station when its working is completed.

An additional object is to provide a new and improved means and method for the working of small segments of tubular stock to reduce the time and steps required to convert it to a precision formed end product.

Another object is to provide a new and improved delivery chute, particularly applicable to the delivery of short lengths of tubular or cylindrical stock to a working station.

A further object of the invention is to provide new and improved means and methods for the transfer of tubular or cylindrical stock from one station to another in the course of a manufacturing procedure.

Another object is to provide new and improved means and procedures for gripping and positioning tubular or cylindrical stock with reference to tooling to be applied in the working thereof.

An additional object is to provide new and improved apparatus, particularly advantageous for use in the processing and fabrication of tubular or cylindrical articles, possessing the advantageous structural features, the inherent meritorious characteristics and means and method of their use and application herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawings wherein some but not necessarily the only forms of embodiment and application of the invention are illustrated, generally schematically.

Like parts are indicated by similar characters of reference throughout the several views.

The illustrative embodiment herein set forth demonstrates a method, system and apparatus for conducting a machining procedure utilizing the features of the present invention. Its details are limited to only that which is necessary for its understanding. It is applied, by way of example, to tubes 10 which are very short in length.

The procedure and apparatus involved in its use provides for the automated delivery and successive transfer of the tubes 10 to, and the positioning and coaxial centering thereof between and equidistant from, opposed machine tools, applied to simultaneously and precisely face off their respective ends, and the subsequent discharge of the tubes from their working station under the influence of gravity.

In the delivery thereof, the tubes 10 are moved to and through a passage 11 defined by a generally vertically oriented, downwarldy inclined chute 12 to a transfer device 30. One side wall surface 13 of the passage 11 is defined by a portion of one face of a vertically oriented plate 15. The side wall surface 13 extends substantially from the top to the bottom of the plate 15 and its lateral extremities are bounded, essentially the length thereof, by rails 16 and 17, respectively. The rails 16 and 17 extend in lines which are substantially parallel, transversely spaced and in the common plane thereof have an identical inclination to a vertical which corresponds in attitude with that required for the passage 11 of the chute 12. As so applied the rails 16 and 17 together with the plate 15 define a track 18, the base of which is the surface 13. The opposite side wall surface 13' of the passage 11 is provided by a portion of one face of a vertically oriented plate 19. The latter is positioned in a directly opposed, side by side, parallel, closely spaced relation to the plate 15 and its surface portion 13' is similarly positioned with reference to the surface 13. The lateral extremities of the wall surface 13' are respectively bounded by rails 16' and 17'. The formation and orientation of the rails 16' and 17' is a mirror image of that of the rails 16 and 17 and they are similarly fixed, but in this instance in connection with the plate 19 to define therewith a track 18' the base of which is the wall surface 13'.

The rails are relatively shallow in depth and they project equally, the length thereof, from the surface to which they mount. Furthermore, the rails 16 and 16' and the rails 17 and 17' are respectively paired and directly opposed in an equally spaced relation.

As thus constructed, the chute 12 is comprised, in total, of the plates 15 and 19, the rails 16,16', 17 and 17' and the screws which connect the rails to the plates 15 and 19. The adjacent side edges of the rails and the surfaces 13 and 13' accordingly define the cross section of the passage 11, the length thereof. In the use of the embodiment herein illustrated the dimension of the spacing between the surfaces 13 and 13' is made slightly greater than that of the axial length of a tube 10, while the dimension of the spacing between the inner side edges of the bounding rails is made only slightly greater than that of the outer diameter of the tube 10.

The rails 16 and 17 and the respectively identical rails 16' and 17' are so designed and interconnected with their respective backing plates 15 and 19 as to enable, within their limits, a relatively quick and easily adjustment of the length as well as the cross section of the passage 11 defined by the chute 12.

The rail 16 is formed by two relatively narrow, elongate, plates 21 and 22 mounted so one thereof forms an extension of the length of the other. Viewing the rail as its extends from the top to the bottom of plate 15, the plate 21 is relatively short in length and has a rectangular configuration modified at its lower end by a very narrow, relatively elongate projection 23 forming an axial extension of its edge portion which forms the upper part of the inner edge portion of the rail. As seen in the drawings, in the assembly of the plates 21 and 22, the projection 23 is applied to overlap and abut the uppermost end portion of that side edge of the plate 22 which serves at the continuation of the inner edge portion of the rail. By reason of this, the plate 22 is naturally offset, laterally and outwardly with reference to the inner edge of the plate 21. To compensate for this offset the lowermost end of the projection 23 is angled to form a portion of the inner edge of the rail 16 affording a smooth transition surface as between the otherwise uniformly parallel relatively offset portions of this inner edge provided by the plates 21 and 22.

The plate 21 has a plurality of tapped apertures which align with apertures of substantially the same size provided in the body of the plate 15. These apertures so aligned accommodate the projection therethrough of screws, the heads of which abut the outer face of the plate 15 and the threaded opposite ends of which threadedly engage in the tapped apertures in the plate 21 to fixedly but releasably clamp the plate 21 in place. The plate 22 has tapped apertures therein which are longitudinally spaced, each of which in the mount of the plate 22 overlies one of a pair of longitudinally extended, longitudinally spaced slots formed in the plate 15. In this particular case, while the plate 22 is clamped to the plate 15 in a similar manner and using similar screws, the slots permit an axial adjustment of the plate 22 to extend or reduce the length of the rail 16, if and when required.

The rail 17 has a generally similar composition in that it is composed of two relatively narrow elongate rectangular plates 24 and 25, one of which forms an extension of the length of the other. In this case the upper plate 24 is specifically rectangular and somewhat longer than the plate 21 and while it also has tapped apertures, they each respectively overlie a slot 27 in the body of the plate 15 which has a transverse orientation. It is the plate 25 which has a narrow projection 26 at its upper end to form an axial extension of its edge portion which forms part of the inner edge portion of the rail 17. The projection 26 is similar to the projection 23 in that it overlaps that edge portion of the plate 24 which forms part of the inner edge of the rail 17 in advance thereof, the plate 24 being slightly offset to accommodate the same. The plate 25 also has longitudinally spaced tapped apertures in the body thereof, in this case respectively overlying a diagonally oriented slot 28 in the backing plate 15. As will be obvious, with the application of screws of the nature and in the manner used to clamp the plates 21 and 22 to the plate 15, one can fix the plate 24 in any position of lateral adjustment within the limits of the slots underlying its apertures, while maintaining it in a parallel relation to the plate 21. By the same means, one can adjust the position of the plate 25 laterally and at the same time elongate the length of the rail 17 or shorten the same, as descired, within the limits of the accommodation of the diagonal slots 28. The arrangement for adjustment of the positions of the plates forming the rails of the tracks 18 and 18' is most satisfactory and efficient in use and enables the system described to be readily adapted to changing needs within the dimensional limits of the parts.

Since the cross section of the passage 11 is so sized as to closely contain a single tube 10 with its ends in a respectively facing immediately adjacent relation to the surfaces 13 and 13' and its body immediately and laterally confined between the rails, the tubes are maintained in a substantially horizontal attitude during their movement through and to the point of their discharge from the chute 12. This is the attitude required for each tube in its working station, at which point each of its respective ends will be simultaneously worked. By reason of this enforced attitude, the tubes 10 naturally stack, one on the other, in the chute 12, a condition which, as will be seen, contributes to an effective and efficient transfer of the tubes to their working station. The maintenance of this attitude in the transfer procedure is insured by the form, configuration and manner of operation of the transfer device 30. The latter is an integral structure having the form of an arm embodying a tubular hub 40 by means of which it mounts on and for rotation about a horizontally oriented pivot pin 32. The pin 32 is below and generally in line with the passage 11 and fixed in suitable supports which maintain its longitudinal axis parallel to that of each tube 10 moving through and exiting from this passage. The length and configuration of the transfer arm provides that in the pivoting thereof its projected extremity moves across and essentially blocks the discharge end of the chute 12.

Figure 1:
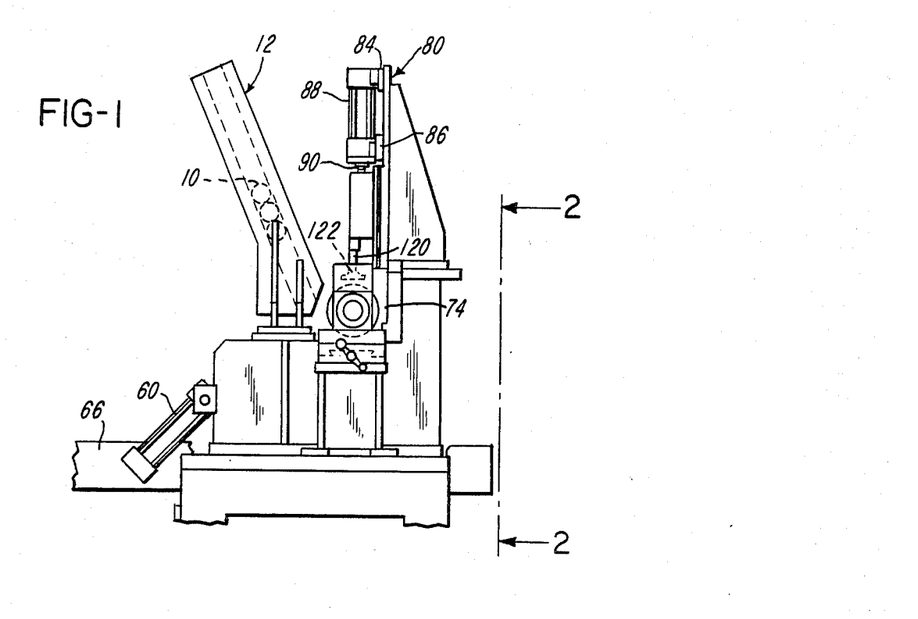
FIG. 1 shows a front elevation of apparatus constituting an embodiment of a system for working short lengths of tubular stock into finished products.
Figure 2:
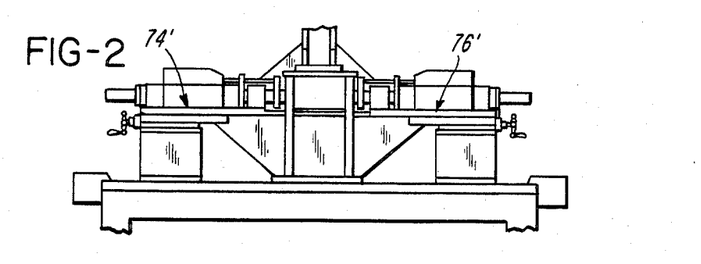
FIG. 2 is a side view thereof.
Figures 3, 4:
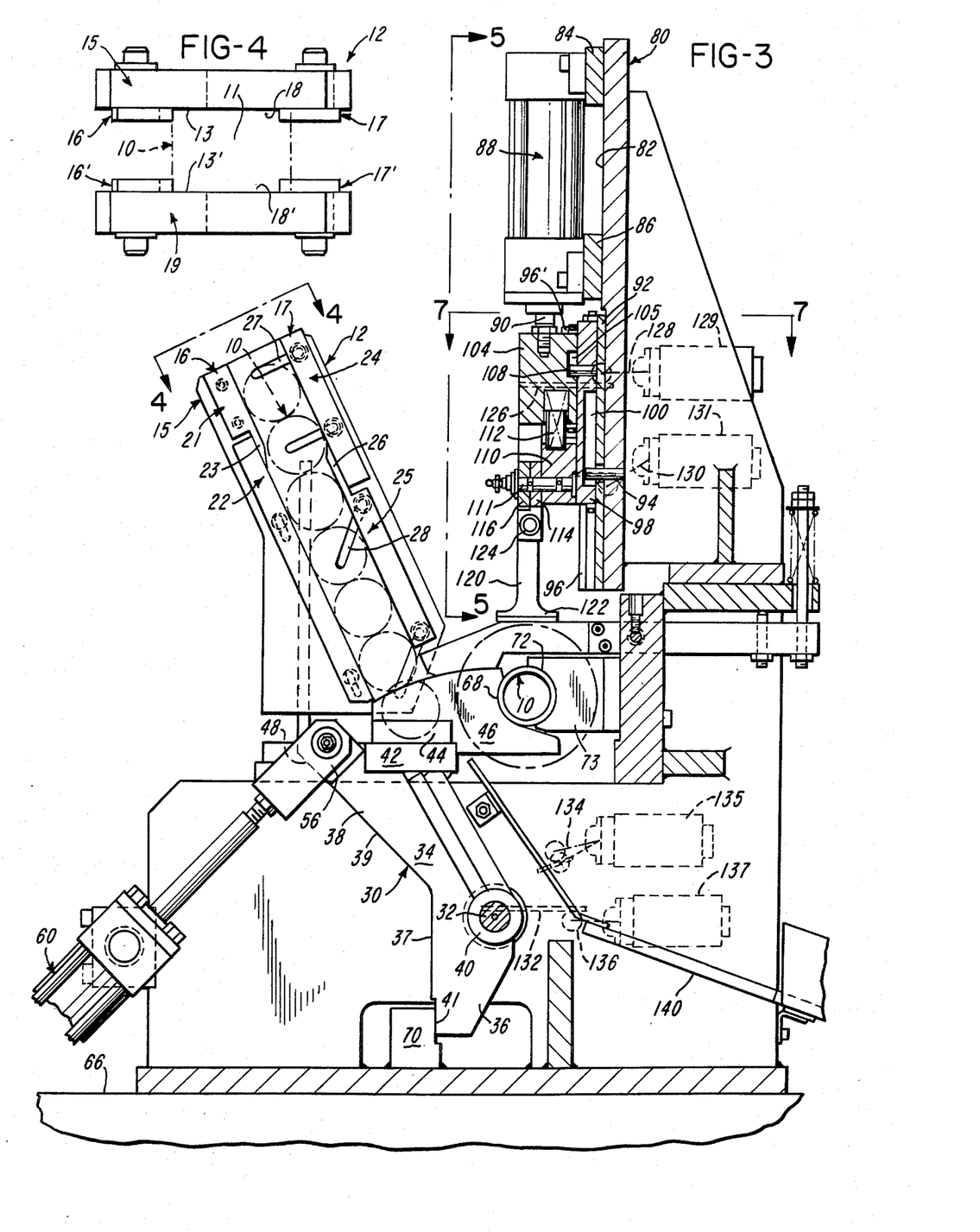
FIG. 3 is a view similar to that of FIG. 1 with parts broken away and others shown in section to reveal detail of its pertinent structural components.
FIG. 4 is a view taken on line 4—4 of FIG. 3.
Figure 6:
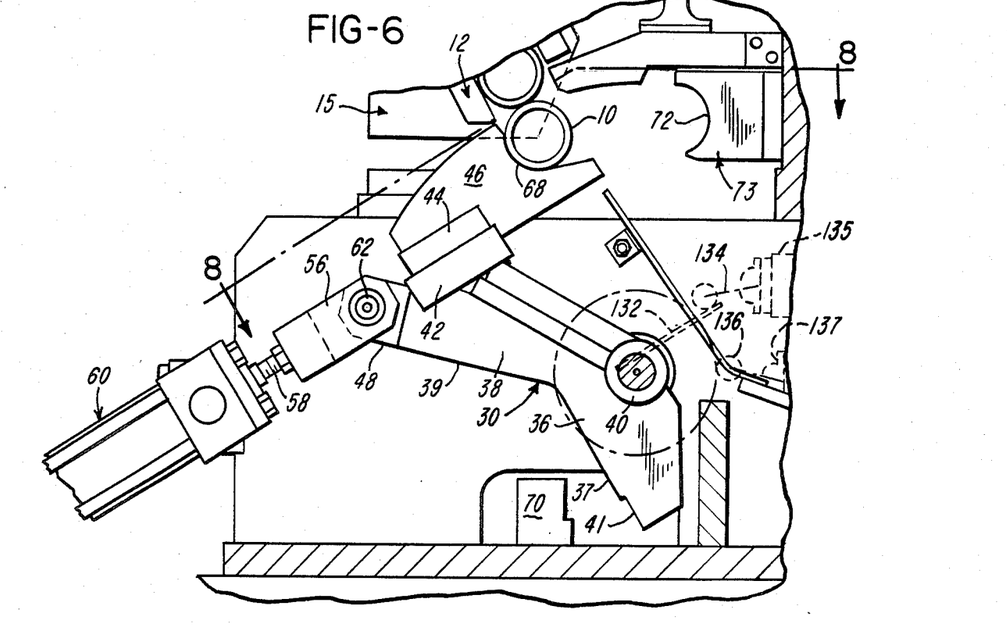
FIG. 6 is a view of a portion of the structure shown in FIG. 3 illustrating the transfer arm in that position thereof in which it receives stock from the delivery chute for its transfer to a working station.
Figure 7:
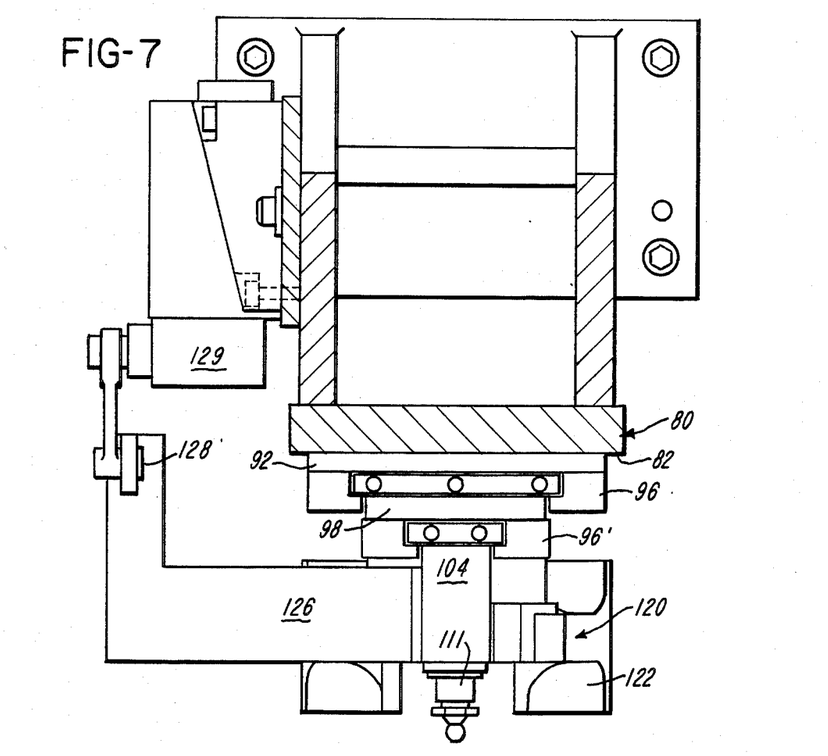
FIG. 7 is a view taken on line 7—7 of FIG. 3.
Figure 8:
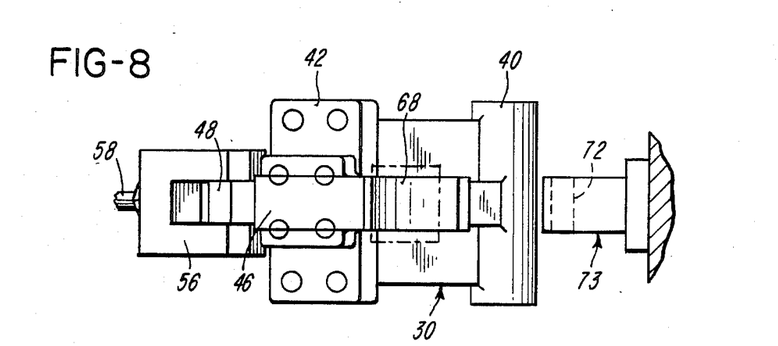
FIG. 8 is a view taken on line 8—8 of FIG. 6.

The transfer arm 30 includes a plate portion 34 fixed to the hub 40 in a bisecting perpendicular relation to its longitudinal axis and in a plane centered between its ends. As seen in FIGS. 3 and 6 and considering the direction the transfer arm must rotate to deliver stock to its working station in the course of its cyclic function, plate portion 34 includes a leg portion 36 which depends below the hub and a leg portion 38 which is above the hub and has its trailing edge 39 forming an obtuse angle with the leading edge 37 of the leg 36. The leg 36 has a rectangular notch 41 in the projected extremity of its leading edge 37 the purpose of which will soon become obvious.

The position of the hub 40 with reference to the angularly related leg portions 36 and 38 provides that it nests in part in a complementary recess in the trailing edge of the leg portion 36 immediately below its uppermost end. The arm 30 also embodies reinforcing plates fixed at and perpendicular to each of the opposite sides of the plate 34. The reinforcing plates project laterally of the plate 34 as well as radially outward from the hub 40, in a diametral plane thereof. The radially outermost ends of the reinforcing plates terminate at a cut-back portion of the leading edge of the leg 38 and commonly therewith serve to mount a rectangular plate defining a fixedly connected platform 42.

The head of the arm 30 is provided by an element 46. A portion 44 of the element 46 located at its trailing end, contemplating clockwise movement of the arm from its position shown in FIG. 6, is flanged at its base, overlies the platform 42 and is secured thereto by screws. Immediately forward of the portion 44, the element 46 has a dependent portion which extends from this point to its leading edge and forms, in the process, a shoulder immediately of and in abutment with the leading end of the platform 42. As seen in profile, in a direction from its trailing end to its leading end, the radially outermost surface of the head 46, as referenced to its underlying platform 42, has a smooth curve exhibiting a substantially uniform radius and moving outwardly to a gradually increasing degree from the base of the head to reach an apex at a point adjacent but short of the leading end of the head. Following such point said profile, for a very short distance, angles sharply inward and inclines in the direction of the leading end of the head and is then distinguished by a shallow reverse curve thereof formed on a uniform radius which corresponds in dimension to the radius of the outer surface of the tubular stock 10 and has an arcuate extent which is about 120°. From this curve the profile is extended in a line tangential thereto which inclines gradually towards the underlying surface of the head 46 at its leading edge, at which the profile of the radially outermost surface of the head terminates.

An outwardly projected portion 48 of the leg 38 including the projected extremity of its trailing edge which is spaced from and located immediately counterclockwise of the head 46 and reduced as to its thickness is inserted in and between the legs of a bifurcated head 56 connected with and forming an extension of a piston rod 58 projected from one end of a hydraulic cylinder 60. The head 56 and the portion 48 of the leg 38 are provided with apertures which are transversely aligned and receive therethrough a pin 62 suitably fixed to provide a pivot connection as between the rod 58 and the arm 30. The rod 58 is connected to and projected from a piston contained within and having a bearing relation to the inner surface of the cylinder housing, wherein it may be reciprocated under the influence of applied pressure fluid in a conventional manner. The opposite end of the cylinder 60 is pivotally connected to a bracket suitably anchored to a base structure 66 in connection with the frame structure of the apparatus of the invention which serves to provide suitable supports, where necessary, for the herein described elements of the invention. As seen, the level of the bracket to which the cylinder 60 is pivotally connected is below that of the lowermost end of the transfer arm 30.

When the rod 58 is originally set in its retracted position, shown in FIG. 6, the arm 30 which is controlled thereby is correspondingly set to present the reversely curved portion of the profile of its head 46 which defines the pocket 68 immediately of and in direct alignment with the exit opening of the passage 11 at the lowermost end of the chute 12. In such case, as soon as lengths of tubular stock are introduced to the passage 11, the lowermost thereof passes directly from the chute and smoothly seats in the pocket 68, without change in its orientation with reference to the working station. Such orientation of the stock is maintained as the cylinder 60 is energized to project the rod 58 and pivot the arm 30, thereby to move the stock into the working station where a portion thereof is brought into abutment with a concave surface portion 72 of a fixed abutment device 73. The surface 72, in cross section, is formed on a uniform radius which corresponds substantially to the radius of the stock and is complementary to the surface portion of the head 36 in which the stock is carried in the delivery thereof to said station.

Attention is directed to the fact that as the transfer arm 30 is pivoted clockwise from its stock receiving position the contour and position of the radially outermost surface of its head 46, which positions immediately of and moves across the exit end of the chute 12, serves to provide a continuing block thereof and prevents a further discharge of stock until the pocket 68 is realigned therewith. Note also that as the transfer arm carries the stock into the working station the tail or lowermost end of its leg 36 has the recessed portion of its leading edge, defined by the notch 41, brought into a position immediately of a block-like structure 70 which defines a positive limit to the clockwise pivoting of the arm 30.

In the application herein illustrated, the working station for each tube 10 is in line with a pair of opposed axially spaced tools 74 and 76. The tools 74 and 76 are arranged to suitably and simultaneously work the respective ends of each tube element subsequent to its precise positioning therebetween in coaxial alignment therewith and in an equidistantly spaced relation thereto. This positioning of a tube is essentially achieved by maintaining the axis thereof substantially parallel to and in lateral alignment with the position it must assume for working thereof throughout the period during which it is moved down the chute 12, carried by the transfer arm 30 and moved into the working station. The precise coaxial alignment with the tools is achieved when it is finally clamped in place by the head of the transfer arm 30 immediately following an application thereto of what may be deemed an equalizer apparatus to be further described.

The tools 74 and 76, the details of which are not essential to an understanding of the present invention, are respectively mounted on base supports 74' and 76' on which they may be simultaneously and coaxially moved into and out of working engagement with the ends of a tube 10. They move in an adjacent parallel spaced relation to a vertical plate structure 80 located above and to the side thereof remote from the head 46 of the arm 30 as it is applied in carrying a tube 10 to its working station. The plate 80 mounts a compound slide for vertical movement thereon and relative thereto which carries the aforementioned equalizer apparatus to and from the working station, as well as the tube 10 which is delivered thereto by means of the arm 30.

The plate structure 80 is suitably fixed in its vertical position by reinforcing plate structure to which it is integrated and the total of the plate structure is integrated with additional supporting and backing plate structure including a portion which serves as a base support not only for the tooling machinery but for the means which mount the plates 15 and 19 and provide supports for the pivot pin 32 as well as the base supports for the pivotally mounted cylinder 60.

Fixed at the uppermost end of the face 82 of the plate 80 which is most adjacent the working station are vertically spaced pads 84 and 86 to which the housing of a hydraulic cylinder 88 is suitably secured. The cylinder 88 is so mounted that is central longitudinal axis, and correspondingly its piston rod 90, is in a parallel spaced relation to the face 82. The rod 90 is connected to and projected from a piston contained within and having a bearing relation to the inner surface of the housing of the cylinder 88 wherein pressure fluid may be applied in a conventional manner to project or retract the piston rod.

A rectangular wear plate 92 is also secured to the face 82 of the plate 80, in alignment with and immediately below the pads 84 and 86. The plate 92 has a laterally centered aperture adjacent but spaced from its lower end which accommodates the projection therethrough of a limit pin 94 anchored at one end in and projecting outwardly from and perpendicular to the surface 82 of the plate 80 and the wear plate 92. Based on and running the length of each of the lateral extremities of the outermost face of the plate 92 is a guide manner 96 which is right angled in cross sectional configuration. The members 96 each have one leg of their right angled configuration perpendicular to the plate 92 and secured to it and the plate 80 by screws, while their other leg is caused to extend over and in spaced parallel relation to the outer face of the wear plate immediately inward of the secured leg. The members 96 provide parallel guides in which are slidably received lateral flanges of a plate 98 mounted over and in face abutting relation to the wear plate. The plate 98 is somewhat vertically extended and has in the back surface thereof, which bears on the wear plate, a laterally centered elongated vertically oriented groove 100 which receives therein the projected extremity of the pin 94. The flanges on the plate 98 are produced by a stepping of the plate at its lateral limits, by virtue of which the balance of this plate structure projects outwardly between the limits of the guides 96.

Slide type guides 96' similar to the members 96 are secured to and over the outermost face of the plate 98 along the lengths of its lateral extremities.

The piston rod 90, the operative end of which projects through, outwardly of and in bearing relation to the head of cylinder 88 at the lower end thereof is threadedly engaged in and to one end of a cam block 104. The block 104 is rectangular in configuration and has laterally projected flanges along and in connection with the lateral extremities of its base which lodge and bear for sliding movement in the channels defined by the guide elements 96'. The base of the block 104 has a laterally centered vertically oriented groove 105 in the face thereof which bears on the plate 98 by which it is backed. This slot is relatively short in length and has projected therein a limit pin 108 one end of which is anchored in and projects outwardly from and perpendicular to the outermost face of the plate 98.

A further block 110 is applied over the outermost face of the plate 98 at a location normally spaced below and from the normally static position of the block 104. In this case the block 110 is releasably fixed to and for movement with the plate 98, in the function thereof. The upper end of the block 110 has a laterally centered pocket which is cylindrical in configuration and nests one end of a coil spring 112, the upper opposite end of which nests in a similar axially aligned pocket in the lower end of the cam block 104.

The slidable elements based on the plate 80 are all normally held in their upper position on and with reference to its vertical elevation by virtue of a retracted condition of the piston rod 90 which keeps the block 104 elevated, and correspondingly the plate 98, by means of the pin 108. At the same time the block 110 is also kept elevated due to its connection by screws to the plate 98.

Figure 5:
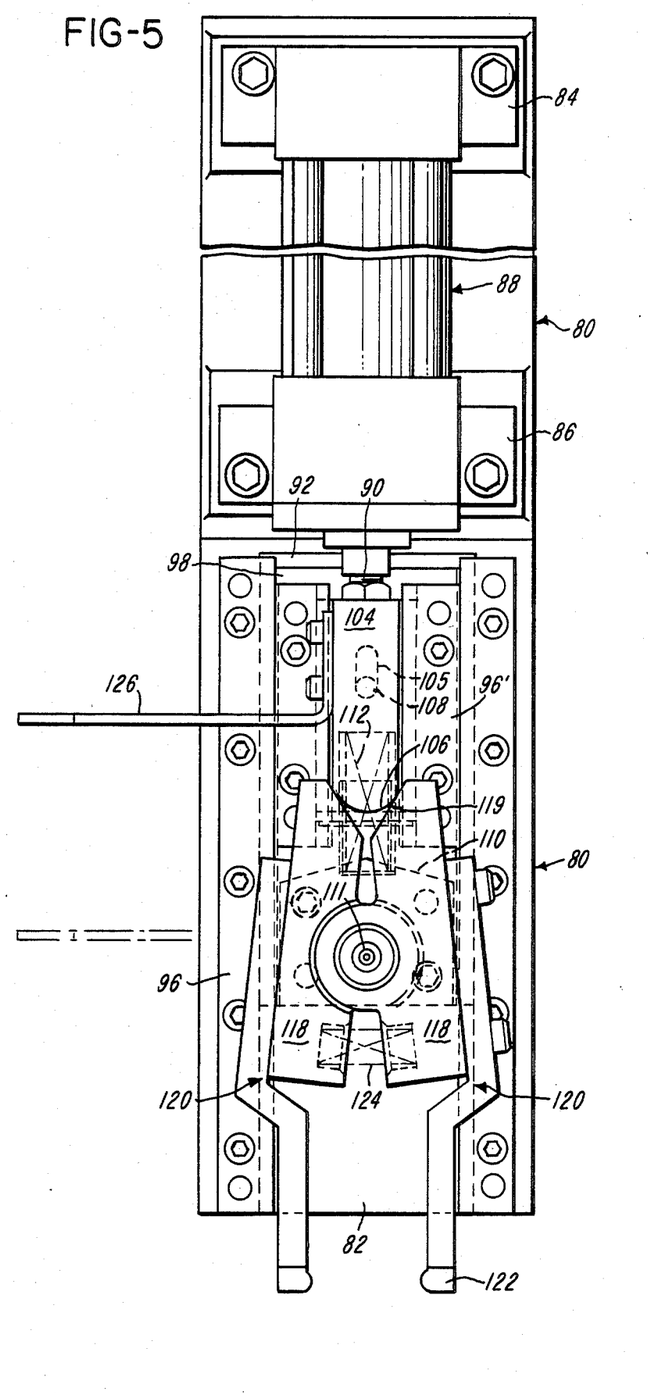
FIG. 5 is a view taken on line 5—5 of FIG. 3.

The block 110 has a laterally centered aperture adjacent its lower end which opens from and perpendicular to its face outermost from the plate 80. This aperture accommodates a bearing type pivot element 111, a portion of which projects outwardly of the block 110 and through coaxial apertures in overlapped ears 114 and 116 each formed in connection with and respectively projected from one of the adjacent sides of otherwise laterally but closely spaced bars 118 outermost remote sides of which mount bars 120 which extend downwardly of these sides, angle inwardly to a small degree, towards each other beyond the lower ends of bars 118 and then depend downwardly therefrom in normally parallel, spaced, relation below the lower limit of the plate 80. The lowermost ends 122 of these parallel portions of the bars 120 are laterally extended to give them an inverted "T" shape in side elevation. As seen in FIG. 5, the bars 120 are equivalent to fingers the tips of which and their lowermost portions 122. The fingers 120 are normally spread, as shown in FIG. 5, by a coil spring 124 inserted between and having its respective ends within and seated to the base of pockets respectively provided in the adjacent faces of the bars 118 at a location below the pivot 111. Note further that the outward bias and spreading of the lower ends of the bars 118 by the interposed spring 124 results in their upper ends being convergent. The immediately adjacent sides of the bars 118 at their uppermost ends are cut back so their facing surfaces essentially define the respective sides of a "V". Bearing on these respectively divergent relatively inclined upper end portions of the immediately adjacent sides of the bars 118 is the lowermost rounded end portion 106 of the cam block 104. As will be further described, a relative downward movement of the cam block 104 against the bias of the spring 112 will serve to spread the upper end portions of the bars 118, as a result of which the finger tips 122 of the bars 120 will be brought more closely together.

A control arm 126 is fixed to and projected outwardly from one side of the cam block 104 and perpendicular thereto. As will be seen, the cam 126 moves between and selectively operates the respectively vertically spaced control elements 128 and 130 of switches 129 and 131 as and for purposes to be further described.

Similarly a control arm 132 is fixed to project laterally from and perpendicular to the transfer arm 30 to operate the respective control elements 134 and 136 of switches 135 and 137. The purpose of this will also be further described.

In the use of the above described apparatus in processing tubular stock to produce small precision formed tubular end products, the lengths of basic tubing to be worked are first cut from relatively long metal tubes in a conventional manner. They are then appropriately channeled to align with and roll into the upper end of the passage 11 of chute 12. As they enter this passage, the ends thereof will be directed into the tracks 18 and 18' to be respectively immediately contained at their outer periphery by the rails 16 and 17 and 16' and 17'. By virtue of this arrangement and the facing base surfaces 13 and 13' of the tracks which the respective ends of the stock immediately face, the longitudinal central axis of the stock is established in a substantially parallel relation to that position it must assume in the working station for the stock. This orientation of the stock and its longitudinal axis is maintained as it drops through the passage 11 and in the course of its exit therefrom.

Before the initial energization of the cylinder 60, its rod 58 will be retracted to position the transfer arm 30 so that in the initial position thereof it is ready to and does in fact catch the first element of basic stock 10 which exits from the cute 11 in its pocket 68 and by virtue of the energization of the cylinder to produce a projection of the rod 58 the arm 30 will move clockwise from the position as seen in FIG. 6 of the drawings to carry the stock 10 to that position shown in FIG. 3 wherein it is brought into a nesting relation to the surface 72 of the limiting abutment device 73. At this point the stock to be worked will be closely contained between the head 46 and the surface 72 but not yet clamped in place. As the stock is brought into this position the control arm 132 will engage the switch operator 136 and effect a closing of the switch to initiate the closing of an appropriately provided circuit to induce to infeed of pressure fluid to the cylinder 88 in a direction to induce a projection of its piston rod 90 and a direct axial downward movement of the cam block 104. By virtue of the nature of the spring 112 the downward movement of the cam block 104 will produce a direct and concurrent downward movement of the block 110 and the plate 98. The conjoint downward movement of the elements 104, 112, 110 and 98 and those associated in connection therewith will continue for a distance determined by the vertical extent of the groove 100 in the plate 98 and terminate as the surface defining the upper limit of the groove 100 comes into contact with the limiting pin 94. As this occurs the pressure fluid applied to the piston and the cylinder 98 will be sufficient to continue the movement of the cam block 104 in a downward direction, against the opposite bias of the spring 112, compressing the spring 112 in the process and projecting the portion 106 of the cam block downwardly between the immediately facing inclined surfaces 119 at the upper end of the inner side surfaces of the pivotally related bars 118.

Note is made that at the point the downward movement of the plate 98 is interrupted by the surface at the upper limit of the groove 100 abutting the limit pin 94, the tips 122 of the fingers 120 will be disposed immediately outward of the in line with, approximately, the diametral centers of the respective ends of the stock 10 in the working station. As the cam block moves downwardly of and relative to the plate 98 in the final phase of its movement to project its portion 106 downwardly and inwardly between the upper ends of the elements 118, this spreads the same and induces a closing of the fingers 122 towards each other and in the direction of the stock 10 therebetween. The closing of the fingers 122 on each other will continue at a uniform and even rate on the part of each, as a result of which the fingers in obvious manner will function to control the axial position of the stock and physically insure that its longitudinal center is positioned precisely at that point in which it is required to insure that the tools 74 and 76 will uniformly work its respective ends and result in a precision and indentical working thereof, as desired. In the completion of the downward movement of the plate 98 and the continuing downward movement of the cam block 104 the control element 126 in connection with the cam block engages the switch operator 130 to close a circuit to apply a signal, with a slight time delay, to increase the pressure applied to project the rod 58 to cause the head 46 to formly clamp the stock against the surface 72 once the axial position of the stock is set and then induce a reversal and retraction of the rod 90. This last results in an initial upward movement of the cam block 104 relative the plate 98 until the compression of the spring 112 is reduced to its normal level and the surface defining the lower limit of the groove 105 rises to abut the pin 108. This retraction of the block 104 and its end 106 upwardly of the surfaces 119 permits the latter to come closer together and there is a resultant spread of the fingers 120 releasing the stock. In the continuing upward movement of the rod 90 the connected block 104, by means of its engagement of the pin 108, carries upwardly therewith the plate 98 and block 110, as well as the finger assembly 118, 120. When the compound slide and finger assembly is lifted to its original retracted position, the control element 126 engages the operator 128 of switch 129 closing a circuit inducing the movement of the tools 74 and 76 inwardly to the respective coaxially oriented ends of the stock an identical distance, and there is an identical operation of the tools to machine the ends as required to this station. On the completion of the working procedure the tools automatically return to their original positions and inoperative state. This last produces a consequent reverse operation of the cylinder 60 and a counterclockwise pivoting movement of the transfer arm 30. By reason of the shape of the pocket 68 and the slope of the tangentially related portion of the outermost surface of head 46 as it extends to its leading edge, considering the direction in which it previously moved to the working station, as the arm 30 pivots reversely, the stock which has been worked rolls out of the pocket, down said slope to and off what previously was said leading edge. The time at which this occurs is such that the stock drops onto and rolls down an underlying downwardly inclined surface and by way of a chute to a place of deposit for recovery and/or delivery thereof to its next working station.

When the arm 30 reaches the limit of its reverse pivoting movement, the control element 132 hits the operator 134 to close switch 135 to initiate a repeat cycling of the arm 30. The arm 30 will, in this process, receive in the pocket 68 thereof and carry the next stock element 10 dropping from the passage 11 to the working station. It is to be kept in mind that in the preferred embodiment herein illustrated it is the form and orientation of the head 46 that insures that no stock drops from the chute 12 until its pocket 10 aligns with the exit opening of the passage 11.

The preferred embodiment herein illustrated has been presented in a somewhat schematic form and detailed only to the extent necessary for an understanding thereof by those versed in the art. This is particularly so with reference to the circuitry required for the automation of the apparatus. Such may be variously provided and the details thereof, given the extent and nature of the present disclosure, are well within the skills of technicians practicing in this field.

In any case the present invention lends itself to a simple and most economical and most efficient and rapid working and finishing of tubular stock, particularly in short lengths thereof, with essentially full control and protection against malfunction and waste of material. It provides moreover, an extremely high control factor, enabling precision working of difficult to handle stock whether tooling is to be applied at any one time to one or both ends thereof or even to inner or outer peripheral portions thereof. The invention apparatus and elements thereof are quite versatile and the preferred elements herein described per se obviously have benefits separate and apart from their composite. Of course, the invention is equally applicable to various cylindrical stock and stock configurations which lend themselves to similar handling.

Note further that particularly desirable structure of the invention provides apparatus for setting the position of tubular or cylindrical stock for the machining thereof on its delivery to a working station comprising a plurality of finger-like elements mounted on and for movement relative to a support structure, portions of said elements being normally spread, and means to induce the common movement of said spread portions of said elements towards each other, on the movement and placement thereof adjacent to the periphery of the stock delivered to the working station, to close on spaced portions of said stock, said fingers being operable, in the closing thereof on said stock, to place a predetermined point of said stock in a location coinciding with a predetermined point in said station, to provide thereby for a precision working of the stock by the tooling applied thereto in said station.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or privilege is claimed are defined as follows:

1. Apparatus for use in processing tubular or cylindrical stock, particularly short lengths thereof, into precision formed end products comprising means for delivery of said stock to a working station, means operable to establish the precise setting required of said stock with reference to applied tooling on the presentation thereof in said station, said delivery means including a downwardly inclined channelling device and a transfer device, said channelling device being a chute-like structure receiving said stock at an upper portion thereof and discharging said stock from a lower portion thereof, said transfer device comprising a pivotally mounted arm an outermost portion of which embodies means for receiving, nesting and positioning said stock as it is discharged from said chute-like structure to place said stock in substantially that attitude in which it must be presented for the working of one or more end portions thereof, means to cycle said arm between said lower portion of said chute-like structure and said working station, said arm being so formed and positioned in said cycling that said outermost portion thereof including said receiving means positions immediately of said lower portion of said chute-like structure to receive and nest therein an element of said stock which is discharged therefrom and carry said stock therewith to said working station, said means operable to establish said precise setting of said stock comprising a plurality of finger-like elements mounted on and for movement relative to a support structure adjacent said working station, portions of said finger-like elements being normally spread and having means operatively related thereto to induce the common movement thereof towards each other, on the placement thereof adjacent to said stock delivered to the working station, to close on end portions thereof, said fingers being operable, in the closing thereof to contain said stock and place a predetermined point of its axial length in a location coinciding with a predetermined point in said station, to thereby establish a setting for said stock in which it may be fixed and insure a precision working of one or more of the respective end portions of the stock, as so set, by the tooling applied thereto in said station.

2. Apparatus for setting tubular or cylindrical stock delivered to a working station for the machining thereof by tooling applied in said station comprising a plurality of finger-like elements mounted on and for movement relative to a support structure, portions of said elements being normally spread, means to move said spread portions of said elements to a position adjacent said stock on its delivery to said station and thereafter induce the common movement of said spread portions of said elements towards each other, said spread portions of said elements being arranged to close on spaced portions of said stock in a direction and at a rate of movement thereof to engage said stock and place a predetermined point of said stock in a location coinciding with a predetermined point in said working station, said means to move and to close said spread portions of said finger-like elements being arranged for their disengagement from and to clear said stock to permit the working thereof subsequent to the placement of said predetermined point of said stock in a location coinciding with said predetermined point in said station, said support structure including a base and a first plate mounted on and for movement relative to said base, said finger-like elements being mounted on and for movement with said first plate, said means to move and induce the common movement of said spread portions of said elements towards each other including a cam block mounted on and for movement relative said first plate, and means for limiting the movement of said first plate in the direction of said stock, said cam block being adapted to move relative said first plate and closer to said stock upon said limitation of the movement of said first plate to induce said common movement of said spread portions of said elements toward each other.

3. Apparatus for use in processing tubular or cylindrical stock, particularly short lengths thereof, into precision formed end products comprising means defining a working station for said stock, means for the delivery of said stock to said station for the working thereof within said station including means positioning said stock during the course of its delivery in substantially that attitude in which it must be presented to tooling in said station, means at said station cooperating with a portion of said delivery means to relatively loosely hold the delivered stock in substantially the same said attitude, means at said station operable to establish the precise setting required of said stock with reference to applied tooling on the presentation thereof in said station for its machining by tooling applied in said station to one or both ends thereof, said setting means including a plurality of finger-like elements mounted on and for movement relative to a support structure at one side of said working station, portions of said elements being normally spread, means to move said spread portions of said elements to a position adjacent and outwardly of the respective end portions of said stock on the delivery thereof to said station and thereafter induce the common movement of said spread portions towards each other to close on said respective end portions of said stock in a direction and at a rate of movement to engage said stock and set a predetermined point of the axial length thereof in a location essentially coinciding with a predetermined point in said working station and, once the stock is so set, the separation of said elements and their withdrawal from and clear of said stock, to permit the working thereof, and means including a portion of said delivery means to fix said stock in said set position for and during the end working thereof by tooling applied thereto in said working station.

4. Apparatus as in claim 3 wherein said delivery means further comprises a downwardly inclined channeling device and a transfer device, said channeling device being a chute-like structure receiving said stock at an upper portion thereof and discharging said stock from a lower portion thereof, said transfer device comprising a pivotally mounted arm an outermost portion of which embodies means for receiving, nesting and positioning said stock to place it in substantially that attitude in which it must be presented to tooling for the working thereof, said arm having in connection therewith means for the cycling thereof between said lower portion of said chute-like structure and said working station, said arm in the said cycling presenting said outermost portion thereof including said receiving means in a position immediately of said lower portion of said chute-like structure to receive therefrom and nest therein an element of said stock which is delivered thereto by way of said chute-like structure to carry said stock to said working station and loosely hold it in abutment to said cooperating means pending the application thereto and operation of said finger-like elements to establish the precise position required of said stock for the working thereof.

5. Apparatus for use in processing tubular or cylindrical stock, particularly short lengths thereof, into precision formed end products comprising means for delivery of said stock to a working station and means operable to establish the precise setting required of said stock with reference to applied tooling on its presentation in said station, said delivery means including a downwardly inclined channelling device and a transfer device, said channelling device being a chute-like structure receiving said stock at an upper portion thereof and discharging said stock from a lower portion thereof, said transfer device comprising a pivotally mounted arm an outermost portion of which embodies means for receiving, nesting and positioning said stock to place it in substantially that attitude in which it must be presented to tooling for the working thereof, said arm having in connection therewith means for the cycling thereof between said lower portion of said chute-like structure and said working station, said arm in the said cycling thereof presenting said outermost portion thereof including said receiving means in a position immediately of said lower portion of said chute-like structure to receive therefrom and nest therein an element of said stock which is delivered thereto by way of said chute-like structure to carry said stock to said working station, said means operable to establish said precise setting of said stock at said working station comprising a plurality of finger-like elements mounted on and for movement relative to a support structure, portions of said elements being normally spread, and means to induce the common movement of said spread portions of said elements towards each other, on the movement and placement thereof adjacent to the periphery of the stock delivered to the working station, to close on spaced portions of said stock, said fingers being operable, in the closing thereof on said stock, to place a predetermined point of said stock in a location coinciding with a predetermined point in said station, to provide said precise setting for a precision working of the stock by the tooling applied thereto in said station, said transfer device including means to maintain a continuous closure of said discharge portion of said channelling device during the movement of an element of said stock therewith from said channelling device to the location of the working thereof, during which period said transfer device not only provides means to carry said stock therewith but also provides means to support said stock during the precision setting thereof and the working thereof by the applied tooling.

6. Apparatus for use in processing tubular or cylindrical stock, particularly short lengths thereof, into precision formed end products comprising means defining a stock receiving station, means defining a stock working station, delivery means for receiving said stock at said receiving station and carrying it to said working station, said delivery means including a transfer device comprising a pivotally mounted arm an outermost portion of which embodies means for receiving, nesting and positioning said stock to place it in substantially that attitude in which it must be presented to tooling for the working thereof in said working station and in preceding relation thereto a chute-like structure discharging said stock from a lower portion thereof into said outermost portion of said arm in substantially the same said attitude, means to reciprocably cycle said arm between said stations, means at said working station operable to establish an essentially precise setting of said stock in said working station comprising a plurality of elements mounted on and for movement relative to a support structure, portions of said elements being normally spread, and means to induce the common movement of said spread portions of said elements towards each other on the placement thereof adjacent to said stock delivered to the working station, to close on the respectively opposite end portions thereof, contain said stock on the presentation thereof in said working station and place a predetermined point of its axial length in a location coinciding with a predetermined point in said station, to thereby establish a setting for said stock in which it may be fixed and insure a precise working of one or more of the respective end portions of the stock, as so set, by the tooling applied thereto in said station.

7. Apparatus according to claim 6 wherein said receiving, nesting and positioning means is formed to provide an attitude of the stock received thereby such that its longitudinal axis is positioned substantially parallel to that attitude it must assume for the working thereof in said working station.

8. Apparatus for use in processing tubular or cylindrical stock, particularly short lengths thereof, into precision formed end products comprising means for the delivery of said stock to a working station, said delivery means including a transfer device comprising a pivotally mounted arm an outermost portion of which embodies means for receiving, nesting and positioning said stock to place it in substantially that attitude in which it must be presented to tooling for the working thereof, said arm having in connection therewith means for the cycling thereof to and from said working station, means operable to establish an essentially precise setting of said stock at said working station comprising a plurality of elements mounted on and for movement relative to a support structure, portions of said elements being normally spread, and means to induce the common movement of said spread portions of said elements towards each other to close on spaced portions of said stock on the presentation thereof in said working station, said elements being operable, in the closing thereof on said stock, to place a predetermined point of said stock in a location coinciding essentially with a predetermined point in said station, to provide said setting of said stock for a precision working thereof by the tooling applied thereto in said station, said receiving, nesting and positioning means being formed to provide an attitude of the stock received thereby such that its longitudinal axis is positioned substantially parallel to that attitude it must assume for the working thereof in said working station, said plurality of elements being comprised of two thereof the respective spread portions of which apply to respectively opposite ends of the stock as it is presented by said transfer device in said working station to axially shift said stock if such is required for the precision working thereof by the tooling to be applied thereto in said working station.

9. Apparatus useful in the processing of tubular stock, particularly short lengths thereof, into precision formed end products comprising a stock receiving station and a working station, a stock transfer device, means for cycling said transfer device back and forth between said stations in a line which is continuous from one to the other of said stations, said transfer device having a pocket portion formed to loosely receive and carry the stock received thereby from said receiving station to said working station in substantially that attitude in which it must be presented for the working thereof in said station, means defining a complementary limiting abutment for said stock in the movement thereof into said station, means including said cycling means operable on said transfer device and said stock carried thereby to clamp said stock to said abutment means thereby to fix and maintain said attitude of said stock during the working thereof within said station and to release said stock upon the completion of the working thereof in said station, the configuration of said pocket portion of said transfer device being such to provide for a gravity discharge of said released stock in the process of the cycling of said transfer device back to said receiving station.

10. Apparatus as in claim 9 including a stock feeding device forming a channel through which said stock to be worked is fed to said receiving portion of said transfer device, said feeding device providing for the feed of said stock therethrough under the influence of gravity with the longitudinal axis of each thereof maintained substantially parallel to that position which it must assume in said working station and said pocket portion of said transfer device which freely receives said stock is so positioned to receive said stock at said receiving station as to open thereto and have each element of said stock received thereby freely deposit therein for movement therewith to said working station with its longitudinal axis oriented in a line which is substantially parallel to the line of that position it must assume for the working thereof in said working station.

11. Apparatus for use in processing tubular or cylindrical stock, particularly short lengths thereof, into precision formed end products comprising means for the delivery of said stock to a working station including a feeding device and a transfer device for carrying said lengths of stock, one by one, from said feeding device to said working station and means for establishing an essentially precise setting of said stock in the position required for a precision working thereof by tooling applied thereto while in said station, said last named means including relatively opposed, relatively spaced, elements which are normally disposed outwardly of and spaced from said station having means to induce the common and simultaneous operation thereof to move to and close on respectively opposite end portions of a length of said stock being moved into said station and in the process thereof set the axial length of said stock in the position required for a precision end working thereof and means including a portion of said transfer device to fix said stock in said set position for and during the end working thereof by tooling applied thereto in said working station.

12. Apparatus as in claim 11 characterized by said transfer device including a pivotally mounted arm having a head portion formed to receive and carry said stock directly from said feeding device to said working station and means to cycle said arm to and from said working station in a repetitive fashion for this purpose, means positioned at said station to cooperate with said head portion of said transfer device to hold said stock therebetween in a manner to limit its movement laterally while accommodating its endwise movement to achieve the precise setting required thereof in said working station and said means to fix said stock in said set position includes at least a part of said cycling means.

13. Apparatus for use in processing tubular or cylindrical stock, particularly short lengths thereof, into precision formed end products including a stock receiving station and a working station comprising transfer means to receive and carry stock from said receiving station into said working station in substantially that attitude required for the working of said stock by tooling to be applied thereto within said station, means for establishing a precise setting required of said stock for the precision working thereof on its presentation in said station by said transfer means, means providing that said transfer means serves as a continuing support and holding device for said stock for and during the working thereof in said working station, said transfer means having means defining therein a pocketk in which each element of stock carried thereby is received, in part, for movement thereof to said working station, the form of said pocket providing that throughout the period of its transfer the longitudinal extent of said element of stock carried by said transfer means is maintained substantially parallel to the position required for said stock for the precise setting thereof in said working station, said means for the precise setting of said stock comprising means normally positioning outward of the respective ends of said element of stock in said working station and said last named means being conditioned to apply endwise to said stock in said station to position a particular point thereof so it essentially coincides with a predetermined point in said working station.

14. Apparatus for use in processing tubular or cylindrical stock, particularly short lengths thereof, into precision formed end products including a stock receiving station and a working station comprising transfer means to receive and carry stock from said receiving station into said working station in substantially that attitude required for the working of said stock by tooling to be applied thereto within said station, means for establishing a precise setting required of said stock for the precision working thereof on its presentation in said station by said transfer means, means providing that said transfer means serves as a continuing support and holding device for said stock for and during the working thereof in said working station, a feeding device comprising means defining opposed surfaces at least portions of which are vertically oriented and in a facing essentially parallel spaced relation, the spacing between said portions of said surfaces being in excess of but corresponding closely in dimension to that of the axial length of the stock to be worked and each said portion being bounded along the vertical extent thereof by means defining relatively shallow rails which project outwardly therefrom in a parallel spaced relation and have a spacing therebetween in excess of but generally corresponding in dimension to that of the diameter of the stock to be worked, each of said facing portions of said surfaces and the rails which bound the same defining a shallow track, said tracks provided on the respective surfaces being paired in a facing parallel spaced relation and defining therebetween a chute through which the stock to be worked may pass in transit to its working station, the cross section of said chute closely complementing the configuration of the length of the stock element to be fed therethrough, the construction and arrangement providing that the stock fed therethrough will be closely contained in a vertically stacked closely following relation with the longitudinal axis thereof constrained to be essentially horizontal and the end portions thereof closely confined by said rails.

15. Apparatus according to claim 14 wherein said rails are each formed in segments which overlap in part and are adjustable, one segment relative the other, and formed in the adjustment thereof to maintain the continuity of the track of which they form a part while lengthening or shortening the length thereof or narrowing or widening the space between the rails thereof as needs require for the application of said chute of which they form a part.

16. Apparatus for use in delivering tubular or cylindrical stock, particularly short lengths thereof, to a station for the precision working thereof comprising means defining opposed surfaces at least portions of which are verticaly inclined and in a facing essentially parallel spaced relation, the spacing between said portions of said surfaces being in excess of but corresponding closely in dimension to that of the axial length of the stock to be worked and each said portion being bounded along the vertical extent thereof by means defining relatively shallow rails which project outwardly therefrom in a parallel spaced relation and have a spacing therebetween in excess of but corresponding generally in dimension to that of the diameter of the stock to be worked, each of said facing portions of said surfaces and the rails which bound the same defining a shallow track, said tracks provided on the respective surfaces being paired in a facing parallel spaced relation and defining therebetween a chute through which the stock to be worked may pass in transit to its working station, the cross section of said chute closely complementing the configuration of the length of the stock element to be fed therethrough, the construction and arrangement providing that the stock fed therethrough will be closely contained in a vertically stacked closely following relation with the longitudinal axis thereof constrained to be essentially horizontal and the end portions thereof closely confined by said rails, said relatively shallow rails of each said track each being comprised of successively adjacent segments adjacent end portions of which are formed to overlap in part, the segments of one said rail of each track being formed and connected for a substantially axial extension and contraction of adjacent overlapping segments and the other rail of each track comprising segments thereof so formed and connected to have one of an adjacent pair of segments mounted for a lateral displacement thereof to and from said one said rail and the other of said adjacent pair of segments mounted for simultaneous displacement laterally with reference to said one rail and axially with reference to said one of said adjacent pair of segments.

17. Apparatus for use in processing tubular or cylindrical stock, particularly short lengths thereof, into precision formed end products by working one or both ends thereof including means defining a working station for said stock, means defining a station for receiving said stock, a transfer device for receiving said stock at said receiving station and carrying it directly into and holding it loosely against means defining a limiting abutment in said working station, means for cycling said transfer device directly from one to the other of said stations, means for setting the axial position of said stock in response to the receipt thereof in said working station and on setting thereof withdrawing from said station, said setting means having in association therewith means to trigger an application of pressure through said transfer means to clamp said stock in said working station, in the axial position in which it has been set, for the working thereof subsequent to the withdrawal of said setting means from said stock, means energizing said cycling means to recycle said transfer device from said working station back to said receiving station on the completion of the working of said stock, said transfer device including a carrier portion for said stock incorporating means shaped to permit a discharge therefrom of the stock which has been worked in the course of the recycling thereof from said working station back to said receiving station to serve in each successive cycle thereof an identical purpose and achieve a similar end result.

* * * * *

UNITED STATES PATENT AND TRADEMARK OFFICE
CERTIFICATE OF CORRECTION

PATENT NO. : 4,684,309

DATED : Aug. 4, 1987

INVENTOR(S) : Charles Horn; Rickey L. Kelly; Thomas E. Orendorf Terry Kiger

It is certified that error appears in the above-identified patent and that said Letters Patent is hereby corrected as shown below:

Column 1, line 55, insert -- a -- preceding "working".

Column 3, line 66, "downwarldy" is corrected to read -- downwardly --.

Column 4, line 60, "at" is corrected to read -- as --.

Column 5, line 44, "descired" is corrected to read -- desired --, line 58, "for" is corrected to read -- of --.

Column 8, line 32, "is" (second occurrence) is corrected to read -- its --.

line 49, "manner" is corrected to read -- member --.

Column 9, line 55, "and" is corrected to read -- are --.

Column 10, line 9, "cam" is corrected to read -- arm --, line 40, "cute" is corrected to read -- chute --, line 52, "to" (second occurrence) is corrected to read -- an --, line 66, "98" is corrected to read -- 88 --.

UNITED STATES PATENT AND TRADEMARK OFFICE
CERTIFICATE OF CORRECTION

PATENT NO. : 4,684,309

DATED : Aug. 4, 1987

INVENTOR(S) : Charles Horn; Rickey L. Kelly; Thomas E. Orendorf Terry L. Kiger

It is certified that error appears in the above-identified patent and that said Letters Patent is hereby corrected as shown below:

Column 11, line 10, "the" (first occurrence) is corrected to read -- and --, line 26, "indentical" is corrected to read -- identical --, line 33, "formly" is corrected to read -- firmly --, line 54, "to" is corrected to read -- in --. (2nd occurr)

Claim 6, column 16, line 19, "precise" is corrected to read -- precision --.

Claim 11, column 17, line 50, "respectivey" is corrected to read -- respectively --.

UNITED STATES PATENT AND TRADEMARK OFFICE
CERTIFICATE OF CORRECTION

PATENT NO. : 4,684,309

DATED : Aug. 4, 1987

INVENTOR(S) : Charles Horn; Rickey L. Kelly; Thomas E. Orendorf Terry L. Kiger

It is certified that error appears in the above-identified patent and that said Letters Patent is hereby corrected as shown below:

Claim 13, column 18, line 18, "pocketk" is corrected to read --pocket--.

Signed and Sealed this

Twenty-third Day of February, 1988

*Attest:*

DONALD J. QUIGG

*Attesting Officer*  *Commissioner of Patents and Trademarks*